United States Patent [19]

Bodas et al.

[11] 4,420,950
[45] Dec. 20, 1983

[54] PLANT FOR UTILIZATION OF LOW-POTENTIAL WASTE HEAT OF A GAS-PIPELINE COMPRESSOR STATION

[75] Inventors: Janos Bodas; Istvan Papp; György Palfalvi; Zoltan Vadas, all of Budapest, Hungary

[73] Assignee: Energiagazdalkodasi Intezet, Budapest, Hungary

[21] Appl. No.: 364,537

[22] Filed: Apr. 1, 1982

[30] Foreign Application Priority Data

Apr. 1, 1981 [HU] Hungary ................................. 835/81

[51] Int. Cl.³ .............................................. F25D 9/00
[52] U.S. Cl. .......................................... 62/402; 62/87; 62/305
[58] Field of Search ................. 62/55, 86, 87, 88, 305, 62/402; 60/648

[56] References Cited

U.S. PATENT DOCUMENTS

| | | | |
|---|---|---|---|
| 2,958,205 | 11/1960 | McConkey | 62/55 |
| 3,768,271 | 10/1973 | Denis | 62/55 |
| 4,220,009 | 9/1980 | Wenzel | 62/55 |
| 4,240,499 | 12/1980 | Kals | 62/305 |

Primary Examiner—Ronald C. Capossela
Attorney, Agent, or Firm—Young & Thompson

[57] ABSTRACT

The invention relates to a plant for utilization of low-potential waste heat of a gas-pipeline compressor station in a heat consumer which is outside the station such as e.g. district heating systems for homes, for industrial or agricultural purposes. The compressor stations of this type have a compressor driven by a gas motor or gas turbine.

Figure 1:
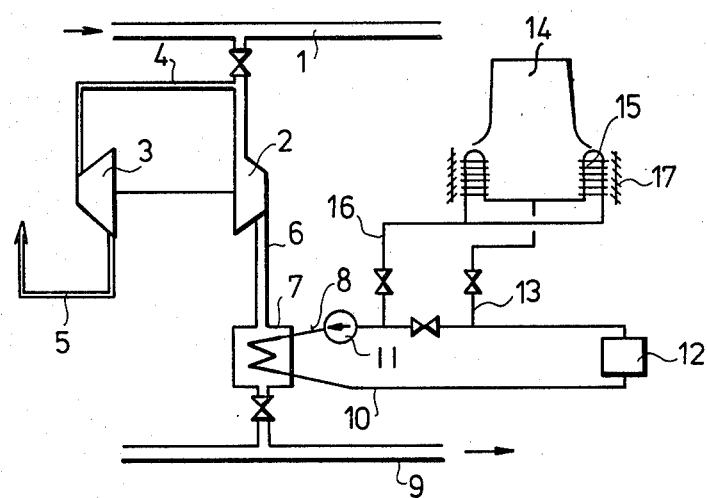

The improvement is in that a surface heat exchanger (7) cooled with liquid, preferably with water is provided for cooling the gas after leaving the compressor and being warmed in the course of compression. The heat exchanger is connected to the heat consumer through a liquid conduit having a circulation pump in it (FIG. 1).

4 Claims, 6 Drawing Figures

PLANT FOR UTILIZATION OF LOW-POTENTIAL WASTE HEAT OF A GAS-PIPELINE COMPRESSOR STATION

The invention relates to a plant for utilization of the low-potential waste heat of a gas-pipeline compressor station in a heat consumer outside the gas compression cycle in which a compressor is used driven by a gas motor or a gas turbine. The compressor station is between a high-pressure and a low-pressure gas pipeline.

The natural and other gases are forwarded from the sites or places of production to the consumers via pipelines having a great diameter under high pressure. In the pipeline, compressor stations are located at a distance of 100 to 200 km. from each other for maintaining the high pressure of the gas and, thus, the speed of transport.

In these stations, the drop in pressure of the gas resulting from the friction losses is made up by the aid of piston compressors or of turbocompressors. As a result, it is possible to forward the gases within the pipeline with a relatively low specific volume. The compressors of the station are usually driven by gas motors or gas turbines operated with gas taken from the pipeline.

Recently, the pipelines transporting gas have a great length of a few thousand km. Therefore, a lot of compressor stations are needed which consume a quite considerable amount of energy. The gas wasted in this way is a relatively high percent of the volume of gas transported in the pipeline.

For increasing the efficiency of gas transportation, systems were developed in which the high temperature exhaust gases coming from the turbines driving the compressors of the station are used for producing steam in heat utilizing steam boilers. With this steam, steam turbines are operated driving, in turn, further compressors. With these systems, the amount of gas used in compressor stations can be lowered by 20 to 30 percent.

The thermodynamical efficiency of the compressor stations can be further improved, if not only the hot exhaust gases of the turbines but the heat brought into the gas while compressing it are utilized, too. Namely, it is generally known that in the course of compression, the temperature of the gas will be higher, too. But, the higher is the temperature in the pipeline, the greater is the volume and the greater are the piping losses. Therefore, it is expedient to recool the gas after compression to its original temperature.

For this purpose, air-gas heat exchangers are used. These heat exchangers, pipes and conduits must be very sophisticated and expensive because of the high pressure of the gas to be cooled. To reduce costs of pipes, the gas coolers are usually placed near to the compressor but this, in turn, makes necessary the use of air operated coolers with forced draught using fan means or the like.

The amount of energy of heat withdrawn from the gas leaving the compressor equals to the energy consumed by the compressor. In the systems used previously, only a small percentage of this heat energy could be made useful. Namely, the efficiency of the compression cycle was increased by pre-heating the feed water of the steam turbine with compressor stations using steam turbine.

The main object of the present invention is to obviate the aforesaid deficiencies of the known systems and to improve the thermodynamic efficiency of the compressor stations in gas pipelines. For this purpose, a plant should be created with which not only the gas to be forwarded can be recooled but the heat energy withdrawn can be made useful, e.g. in a heat consumer outside the compressor cycle. Such plant is distinguished from the above described known systems according to the invention, in that a surface heat exchanger cooled with liquid, preferably with water is provided for recooling the gas after leaving the compressor where the gas gets warmed in the course of compression. This heat exchanger is connected to the heat consumer outside the compression station, i.e. the compression cycle via liquid conduit in which an independent circulation pump is provided.

However, there are two constraints in this system. The gas to be forwarded in the pipeline must always be recooled after compression, even if the heat consumer does not need heat energy. On the other hand, it is very desirable to be able to deliver heat to the heat consumer even if the amount of heat delivered by the gas leaving the compressor is not enough or the compressor does not function.

With respect to the first problem, a closed air-operated cooling tower may be connected to the liquid conduit of the heat exchanger, and in the cooling tower, louvre-type flap valves can be provided for controlling the air draft within the cooling tower.

With a view toward the second constraint, a second heat exchanger heated by the exhaust gases leaving the gas motor or gas turbine can be provided in series with the main heat exchanger. Furthermore, a boiler heated by the gas coming from the gas pipeline can be provided the liquid circuit of which can be connected in series with the main heat exchanger. In another embodiment, the boiler may be a heat utilizing steam boiler heated by the exhaust gases of the gas motor or gas turbine and/or with gas taken from the gas pipeline. With the steam, a third heat exchanger can be heated connected into the liquid circuit of the main heat exchanger, in series with it.

Furthermore, the steam produced in the steam boiler can be used in a steam turbine for driving a second gas compressor which is connected parallelly with the main compressor.

For condensing the exhaust steam of the steam turbine, a condenser and a second closed, air-operated cooling tower can be provided. The coolers of this second cooling tower can be mounted in the main cooling tower and, thus, only one cooling tower might be sufficient. It is an efficiency increasing the solution in which all heat exchangers of the system are connected in series with the main heat exchanger increases the efficiency.

The invention will be described hereinafter in greater detail with reference to the accompanying drawings the figures of which show, by way of example, connection diagrams of various embodiments of the heat utilization plant according to this invention.

Same reference characters refer to similar details throughout the drawings.

In the drawings:

FIG. 1 is a schematic diagram of exemplified embodiment of the plant for utilization of low-potential waste heat of gas-pipeline compressor stations according to this invention; and FIGS. 2, 3, 4, 4a and 4b are views similar to FIG. 1 but showing modified embodiments of the invention.

In FIG. 1 reference numeral 1 refers to a low-pressure gas pipeline entering the compressor station and 9 to a high-pressure gas pipeline leaving the station. Between the pipelines 1 and 9 the compression is effected with a compressor 2 which is driven by a gas turbine 3. The gas for operating the gas motor or gas turbine 3 is conveyed from gas pipeline 1 through pipe 4. The exhaust gases of gas turbine 3 leave through an exhaust pipe 5.

The gas leaving the compressor 2 and having a high pressure is forwarded to gas pipeline 9 through an outlet pipe 6 having a first or main heat exchanger 7. The heat exchanger 7 is cooled, not with air, as in the known solutions, but with liquid, preferably with water, for example with anti-freeze solution. In the liquid circuit of the heat exchanger 7, the cooling liquid enters through a conduit 8 and leaves through another conduit 10. To these conduits 8 and 10 a heat consumer 12 is connected which is illustrated in the drawing as a quadrangle. In the liquid circuit of the heat exchanger 7, a circulation pump 11 is provided.

To the cooling circuit of the heat exchanger 7, a closed, air-operated cooling tower 14 having closed heat exchangers 15 cooled by air and having flap valve louvers 17 is attached. The liquid to be cooled enters the cooling tower 14 through a conduit 13 and leaves through another circuit 16.

The cooling towers in the drawings are operated with natural draught. It will be obvious, that cooling towers having forced draught with fans or the like can find application, too.

In operation, the gas under low pressure coming from pipeline 1 is supplied to compressor 2 driven by gas turbine 3 fed with gas through pipe 4 where it gets compressed. Since the compression in the compressor 2 is under nearly adiabatic conditions, the gas enters the outlet pipe 6 with an increased temperature and pressure. As a result of the higher temperature, the volume of the gas in outlet pipe 6 will be greater, too. To avoid the need for greater energy supply in transporting the gas, it must be recooled before entering the pipeline 9. This is achieved with the heat exchanger 7 cooled with water or other liquid such as anti-freeze solution entering through conduit 8 and leaving after being warmed up through conduit 10. Afterwards, the warm liquid is sent by pump 11 to heat consumer 12 which need not be in the vicinity of the compressor station, but can be a district heating system for public or for industrial or for agricultural purposes. With appropriate dimensioning of heat exchanger 7, the gas having a temperature of 90 to 100 degrees centigrade will be recooled to 40 to 50 degrees centigrade and, on the other hand, the liquid in the heat exchanger 7 will be warmed up to 60 to 80 degrees centigrade. The recooled gas coming from heat exchanger 7 flows into pipeline 9. The cooling liquid of heat exchanger 7 is impelled by circulation pump 11.

It will be apparent that the warm cooling liquid can flow through conduit 13 into heat exchangers 15 of cooling tower 14, too. This is necessary when the heat consumer 12 has a low heat demand which is not great enough for recooling the gas as required. The flow rate of the liquid can be controlled by flow regulating means in conduits 8, 13 and 16. With this arrangement, the compressor station is operable even if the heat of the gas leaving the compressor 2 is not used by heat consumer 12.

Figure 2:
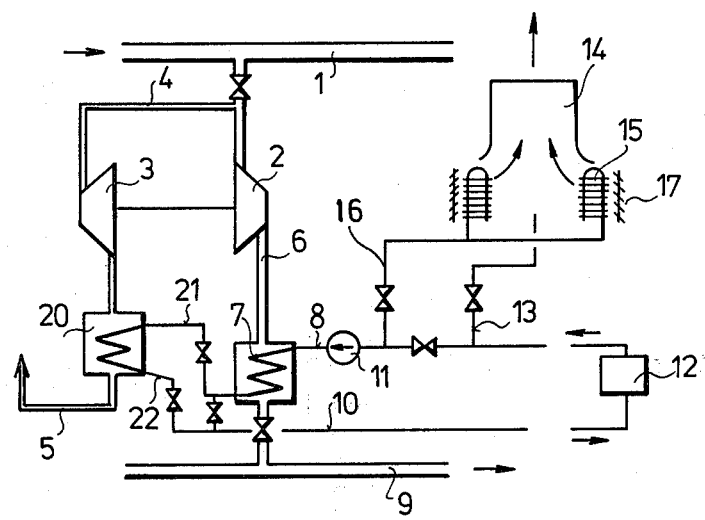

The other aspect of indisturbed function of the heat utilizing plant of this invention lies in the possibility of supplying heat exceeding the amount delivered by the compressed gas. For this, an example is shown in FIG. 2, wherein a second heat exchanger 20 is connected in series with heat exchanger 7 an inlet 21 of which is connected to the outlet of heat exchanger 7, an outlet 22 to conduit 10 forwarding the warmed liquid to the heat consumer 12. With this second heat exchanger 20, the hot exhaust gases of gas turbine 3 are cooled.

In operation, the cooling liquid of the main heat exchanger 7 is supplied to the second heat exchanger 20 the amount of which is controlled with control valves in inlet 21 and outlet 22. In this way, the lacking portion of the heat requirement of the heat consumer 12 will be secured.

Figure 3:
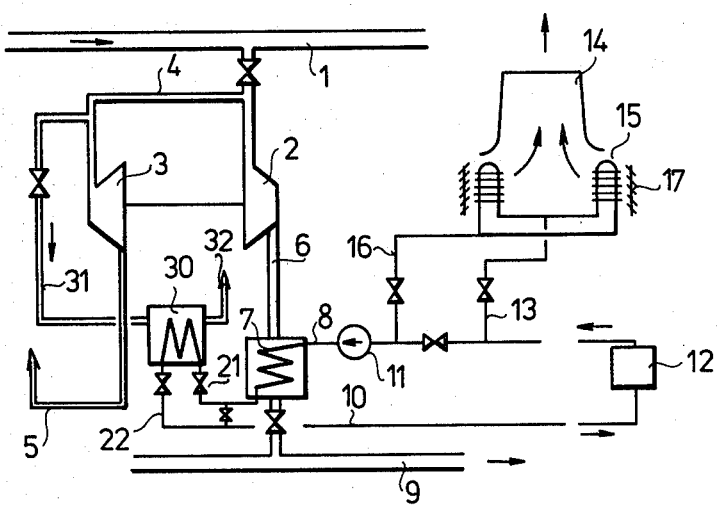

In FIG. 3, another example of auxiliary heat production is shown wherein a boiler 30 is provided the liquid circuit of which is connected in series with the main heat exchanger 7. The boiler 30 is operated with gas coming from the pipeline 1 through by pass 31. The exhaust gases of the boiler 30 are discharged through an exhaust 32.

In operation, the heat produced in the boiler 30 by burning the gas in it is conveyed to the heat consumer 12 together with the heat regained from the gas in the main heat exchanger 7. If the heat delivery of heat exchanger 7 is constant, the variable heat demand of heat consumer 12 is satisfied by changing the heat output of the roller 30 by changing the amount of gas burnt in it. Thus, heat will be supplied to the heat consumer 12 even if the gas turbine 3 stops.

Figure 4:
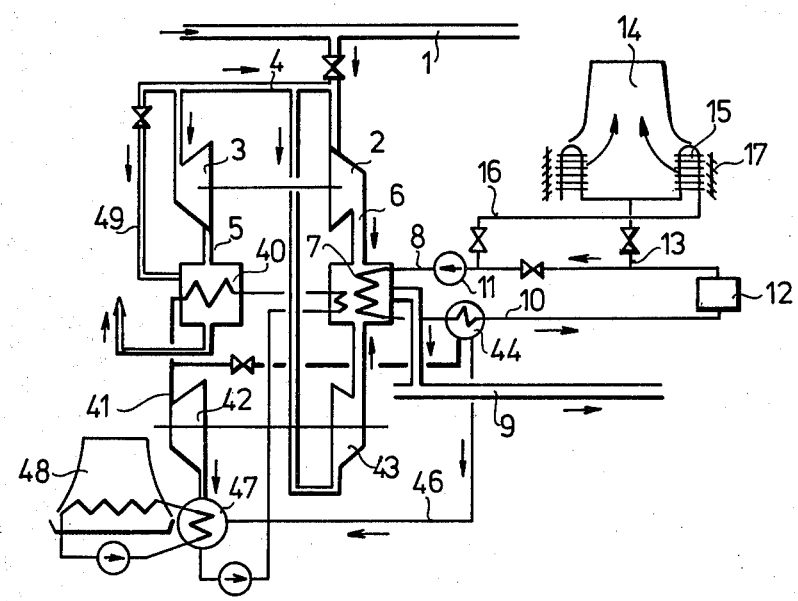

In FIG. 4, a heat-utilizing steam boiler 40 is shown connected to the exhaust pipe of gas turbine 3 and, through a bypass 49, to the pipeline 1. In this steam boiler 40, the heat of the exhaust gases of gas turbine 3 is utilized and, auxiliarly, gas is burnt. The steam is, on the one hand, conveyed to a third heat exchanger 44 connected in series in the liquid circuit of the main heat exchanger 7, on the other hand, supplied to a gas turbine 42 by which a second compressor 43 connected parallelly to compressor 2 is driven. The exhaust steam of the steam turbine 42 is condensed in a condenser 47 the cooling agent of which is recooled in a second cooling tower 48. The condensate of third heat exchanger 44 is conveyed to condenser 47 and, from here, all condensate is forwarded as feed water to the steam boiler 40 after being pre-heated in heat exchanger 7.

In operation, the gas of pipeline 1 is compressed parallelly with both of compressors 2 and 43 the first being driven by gas turbine 3, the second by steam turbine 42. Auxiliary heat is recovered here from the compressed gas leaving the compressor 43 and in the third heat exchanger 44 in the liquid circuit between the main heat exchanger 7 and the heat consumer 12. The necessary amount of steam is provided by the steam boiler 40 having an auxiliary burner system operated by gas. When compressors 2 and 43 do not operate, the heat is provided for heat consumer 12 only through heat exchanger 44.

Figure 4A:
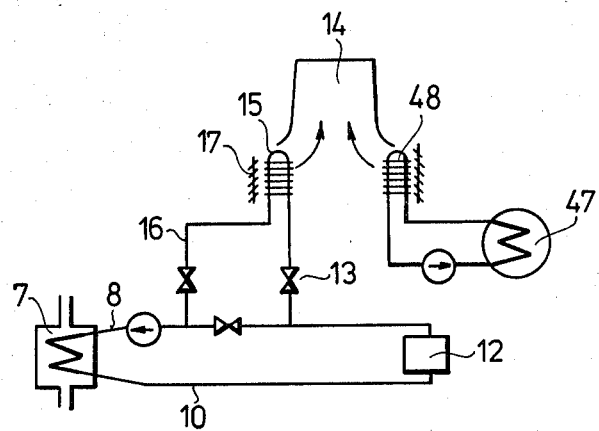
Figure 4B:
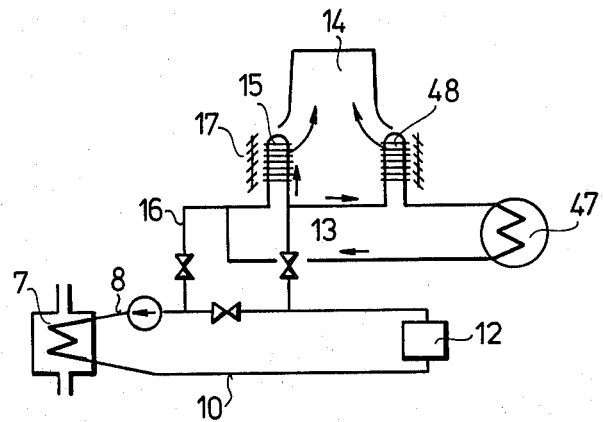

The second cooling tower 48 for condenser 47 can be formed as a part of the main cooling tower 14 as shown in FIGS. 4a and 4b. In FIG. 4a, the heat exchangers of both cooling towers 14 and 48 are in the same casing. In FIG. 4b, the coolers of both cooling towers 14 and 48 are under the same mantle and have a common cooling circuit.

As will be evident to one skilled in the art, the invention is not limited to the examples described hereinabove. Modifications can be made whilst still remaining in the scope of protection.

We claim:

1. A plant for utilization of low-potential waste heat of a gas pipeline compressor station, comprising means to convey gas in gaseous phase to the station at relatively low pressure, means to convey gas in gaseous phase away from the station at a relatively high pressure, a gas compressor between the low pressure means and the high pressure means, a gas expansion motor fed from the low pressure means and driving said compressor, a heat exchanger between the compressor and the high pressure means for cooling gas compressed in said compressor, means to circulate a cooling liquid in a closed circuit in heat exchange with said heat exchanger, a heat consumer warmed by said liquid heated in said heat exchanger, a circulation pump for circulating said liquid in said closed circuit, and means controllably to divert a selected portion of said liquid through an air cooling tower thereby to remove a selected amount of heat from said liquid in addition to the heat which is removed by said heat consumer.

2. A plant as claimed in claim 1, said cooling tower having flap valve louvers for controlling the air draft within the cooling tower.

3. A plant as claimed in claim 1, and a boiler heated by gas from said low pressure means, and means controllably to divert a selected portion of said liquid into heat exchange with said boiler thereby to add to said liquid a predeterminable quantity of heat in addition to the heat which is added to said liquid in said heat exchanger.

4. A plant for utilization of low-potential waste heat of a gas pipeline compressor station, comprising means to convey gas in gaseous phase to the station at relatively low pressure, means to convey gas in gaseous phase away from the station at a relatively high pressure, a gas compressor between the low pressure means and the high pressure means, a gas expansion motor fed from the low pressure means and driving said compressor, a heat exchanger between the compressor and the high pressure means for cooling gas compressed in said compressor, means to circulate a cooling liquid in a closed circuit in heat exchange with said heat exchanger, a heat consumer warmed by said liquid heated in said heat exchanger, a circulation pump for circulating said liquid in said closed circuit, a boiler heated by gas from said low pressure means, and means to divert through said boiler in heat exchange relation with said boiler a predetermined portion of said liquid thereby to add to said liquid heat in addition to the heat which is added to said liquid in said heat exchanger.

* * * * *